(12) United States Patent
Scheller et al.

(10) Patent No.: US 10,900,451 B2
(45) Date of Patent: Jan. 26, 2021

(54) HIGH-PRESSURE FUEL PUMP

(71) Applicant: CONTINENTAL AUTOMOTIVE GMBH, Hannover (DE)

(72) Inventors: Max Scheller, Stamsried (DE); Andreas Ellenberg, Roding (DE); Yury Mikhaylov, Landshut (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 21 days.

(21) Appl. No.: 15/751,625

(22) PCT Filed: Jun. 29, 2016

(86) PCT No.: PCT/EP2016/065163
§ 371 (c)(1),
(2) Date: Jul. 9, 2018

(87) PCT Pub. No.: WO2017/025241
PCT Pub. Date: Feb. 16, 2017

(65) Prior Publication Data
US 2018/0313314 A1  Nov. 1, 2018

(30) Foreign Application Priority Data
Aug. 10, 2015  (DE) .................. 10 2015 215 186

(51) Int. Cl.
*F02M 59/46* (2006.01)
*F02M 63/02* (2006.01)
(Continued)

(52) U.S. Cl.
CPC ........ *F02M 59/462* (2013.01); *F02M 63/005* (2013.01); *F02M 63/0245* (2013.01); *F16K 17/0406* (2013.01)

(58) Field of Classification Search
CPC ............. F02M 59/462; F02M 63/0245; F02M 63/005; F16K 17/0406
See application file for complete search history.

(56) References Cited

U.S. PATENT DOCUMENTS 6,053,712 A * 4/2000 Konishi ............. F02M 63/0225
                                                417/540
8,430,081 B2 * 4/2013 Mancini ............... F02M 59/367
                                                123/446

(Continued)

FOREIGN PATENT DOCUMENTS

CN    1807871 A    7/2006
CN   103161633 A    6/2013
(Continued)

OTHER PUBLICATIONS

International Search Report and Written Opinion dated Sep. 15, 2016 from counterpart International Patent Application No. PCT/EP2016/065163.

(Continued)

*Primary Examiner* — Joseph J Dallo
*Assistant Examiner* — Kurt Philip Liethen

(57) ABSTRACT

The invention relates to a high-pressure fuel pump (10) having a housing (12) in which a pressure-limiting valve (38) is arranged in a bore (36), wherein the bore (36) leads into an inflow volume (30) of a low-pressure inflow (22).

11 Claims, 3 Drawing Sheets

(51) Int. Cl.
    *F02M 63/00*     (2006.01)
    *F16K 17/04*     (2006.01)

(56) References Cited

U.S. PATENT DOCUMENTS

| | | | | |
|---|---|---|---|---|
| 9,200,605 | B2 * | 12/2015 | Kim | F02M 59/265 |
| 9,822,751 | B2 * | 11/2017 | Vezzani | F16F 1/047 |
| 2005/0205065 | A1 | 9/2005 | Rembold et al. | |
| 2006/0196476 | A1 * | 9/2006 | Stockner | F02M 63/0012 |
| | | | | 123/457 |
| 2009/0068041 | A1 | 3/2009 | Beardmore | |
| 2011/0209687 | A1 | 9/2011 | Schroeder et al. | |
| 2015/0020776 | A1 | 1/2015 | Ramamurthy et al. | |
| 2019/0145365 | A1 | 5/2019 | Leblay et al. | |

FOREIGN PATENT DOCUMENTS

| | | | | |
|---|---|---|---|---|
| DE | 3424401 | A1 * | 1/1986 | F02M 59/462 |
| DE | 10118936 | A1 | 11/2002 | |
| DE | 10237593 | A1 | 3/2004 | |
| DE | 10327411 | A1 | 4/2004 | |
| DE | 102004013307 | A1 | 9/2005 | |
| DE | 102008045730 | A1 | 3/2009 | |
| DE | 102008043217 | A1 | 4/2010 | |
| DE | 102009001465 | A1 | 9/2010 | |
| EP | 2434137 | A1 | 3/2012 | |
| GB | 2550144 | A | 11/2017 | |
| JP | 2004138062 | A | 5/2004 | |
| JP | 2010156256 | A | 7/2010 | |
| JP | 2014105668 | A | 6/2014 | |
| JP | 2014136973 | A | 7/2014 | |
| KR | 20110051826 | A | 5/2011 | |
| KR | 20120018395 | A | 3/2012 | |
| KR | 20120018396 | A | 3/2012 | |
| KR | 101182130 | | 9/2012 | |

OTHER PUBLICATIONS

German Office Action dated Jun. 10, 2016 for counterpart German Patent Application No. 10 2015 215 186.7.
Japan Office Action dated Apr. 1, 2019 for corresponding Japanese Patent Application No. 2018-506827.
Korea Office Action dated Apr. 4, 2019 for corresponding Korean Patent Application No. 10-2018-7006547.
Japan Search Report dated Feb. 20, 2019 for corresponding Japanese Patent Application No. 2018-506827.
India Office Action, dated Sep. 25, 2019, for counterpart IN patent application 201817006437.
Chinese Office Action, dated Jun. 5, 2019, for counterpart CN patent application 201680047118.7.

* cited by examiner

HIGH-PRESSURE FUEL PUMP

FIELD OF INVENTION

The invention relates to a high-pressure fuel pump for a fuel injection system of an internal combustion engine.

BACKGROUND

High-pressure fuel pumps in fuel injection systems are used to apply a high pressure to a fuel, wherein the pressure is in the range from 250 bar-400 bar in gasoline internal combustion engines and in the range from 2000 bar-2500 bar in diesel internal combustion engines, for example. The greater the pressure which can be generated in the particular fuel, the lower the emissions which arise during the combustion of the fuel in a combustion chamber, this being advantageous in particular against the background of a reduction in emissions being desired to an ever greater extent.

In order for it to be possible to achieve the high pressures in the particular fuel, the high-pressure fuel pump is typically embodied as a piston pump, wherein a piston moves in translation in a pressure chamber and thus periodically compresses and relieves the pressure on the fuel fed to the pressure chamber.

The pressurized fuel is than usually fed via a high-pressure port to a high-pressure region, for example a pressure accumulator, known as the common rail, connected hydraulically downstream of the pressure chamber, from where the fuel can then be injected into combustion spaces of the combustion chambers via injectors.

In order to prevent the fuel-conducting elements, connected hydraulically downstream of the pressure chamber, of the fuel injection system from being damaged by excessive overpressures, a pressure-limiting valve is usually provided, which discharges excess fuel out of the high-pressure region of the fuel injection system in order to relieve the load thereon.

For example, it is known here to discharge the excess fuel into the pressure chamber itself via a connecting bore of the pressure-limiting valve to the pressure chamber. For example, DE 10 2004 013 307 A1 discloses a pressure-limiting valve in a high-pressure fuel pump, said pressure-limiting valve being arranged in a blind bore and being fluidically connected to the pressure chamber via a bore arranged at an angle of about 90° to the blind bore.

However, a drawback of such an arrangement is that the blind bore serves as a dead water zone and dirt accumulator until the pressure-limiting valve is activated, this preferably being rarely the case. It is only when the pressure-limiting valve is put into operation that accumulated dirt is then conveyed into the pressure chamber.

SUMMARY

The object of the invention is to propose a high-pressure fuel pump that is improved in this respect.

This object is achieved by a high-pressure fuel pump having the features of claim 1.

Advantageous configurations of the invention are the subject of the dependent claims.

A high-pressure fuel pump has a pressure chamber arranged in a housing, said pressure chamber being bounded on one side by a piston surface on a piston that moves in translation along a movement axis in the pressure chamber. The pressure chamber is connected on the inlet side to a low-pressure inflow for feeding fuel to the pressure chamber and on the outlet side to a high-pressure port which, together with the housing, defines an outlet volume. An inlet valve is arranged in the low-pressure inflow such that an inflow bore of the low-pressure inflow is separated from an inflow volume, directly connected hydraulically to the pressure chamber, of the low-pressure inflow. A pressure-limiting valve for discharging an overpressure in the outlet volume is provided, said pressure-limiting valve being arranged in a bore extending from the outlet volume into the housing. The bore leads into the inflow volume of the low-pressure inflow.

Therefore, the bore in which the pressure-limiting valve is arranged is now no longer configured as a blind bore, as previously known, but has a connection to the low-pressure inflow, specifically in the region in which the inlet valve is located. This prevents the previously present blind bore accumulating dirt until the pressure-limiting valve is activated and then conveying it into the high-pressure fuel pump, since the bore in which the pressure-limiting valve is arranged is already flushed constantly during operation of the high-pressure fuel pump.

Preferably, the bore is in the form of a through-bore which has a receiving region for receiving the pressure-limiting valve and a connecting region for establishing a hydraulic connection to the inflow volume. The connecting region has a smaller cross section than the receiving region.

Preferably, the pressure-limiting valve has a restoring spring with a longitudinal axis in the force direction of the restoring spring, wherein the connecting region is arranged coaxially with the longitudinal axis of the restoring spring. As a result, fuel which flows through the pressure-limiting valve can be discharged into the inflow volume in a laminar manner without obstacles.

Advantageously, the receiving region of the bore has an end wall that bounds the bore perpendicularly to the longitudinal axis of the restoring spring, said end wall being arranged on the opposite side from the outlet volume. The restoring spring is supported on the end wall, wherein the connecting region is arranged in the end wall. Therefore, it is advantageous for the cross section of the connecting region to be smaller than the cross section of the receiving region, since the end wall, on which the restoring spring can be supported, is formed automatically in this way.

In a particularly preferred configuration, the bore has a connecting aperture to the pressure chamber for hydraulically connecting the bore to the pressure chamber. In this case, the connecting region and the connecting aperture are separated from one another for example by at least one section of the end wall.

The arrangement of both the connecting region and the connecting aperture allows circulation of the fuel during operation. As a result, accumulation of particles in a rear region of the bore, in which the pressure-limiting valve is arranged, is avoided or reduced. The connecting aperture and connecting region in this case advantageously form complementary flow cross sections when overpressure is discharged by the pressure-limiting valve.

In one embodiment, in which the connecting aperture is not present, the outflow bore, via which the overpressure fuel is discharged, is shifted entirely to the through-bore compared with conventional arrangements. In this case, the through-bore, i.e. the connecting region, can be expanded such that discharging does not take place into the pressure chamber itself but only through the connecting region to the inflow volume. This has the advantage that components of the pressure-limiting valve are no longer impinged on perpendicularly in the operating direction, and as a result made to vibrate, as a result of the change between pressure phase and suction phase within the high-pressure fuel pump.

Preferably, the connecting aperture is arranged in a side wall of the bore, said side wall extending parallel to the longitudinal axis of the restoring spring. As a result, an arrangement at an angle of about 90° to the connecting region preferably arises, and so the fuel to be discharged can be discharged in different spatial directions.

Preferably, a longitudinal axis of the high-pressure port extends substantially perpendicularly to the movement axis of the piston. A longitudinal axis of the bore in which the pressure-limiting valve is arranged is arranged at an angle of between 1° and 10°, in particular between 2° and 8°, preferably between 4° and 6°, to the high-pressure longitudinal axis.

Normally arranged hydraulically between the pressure chamber and outlet volume is an outlet valve, the longitudinal axis of which is usually likewise arranged perpendicularly to the movement axis of the piston. This outlet valve is usually located in a bore in the housing of the high-pressure fuel pump. If the bore in which the pressure-limiting valve is located is now arranged in an angled manner with respect to the bore of the outlet valve and thus to the high-pressure-port longitudinal axis, the outlet volume of the high-pressure port and thus the high-pressure port as a whole can be configured in a smaller manner with the same effect. As a result, forces which act for example on a weld seam of the high-pressure port are reduced considerably, and the high-pressure port becomes much more stable.

Preferably, the longitudinal axis of the bore is arranged substantially at an angle of between 95° and 105°, in particular 98° and 102°, to the movement axis of the piston. As a result of the bore in which the pressure-limiting valve is arranged also being angled in a further spatial direction, the high-pressure port can be reduced in size even further and forces can thus be reduced.

BRIEF DESCRIPTION OF THE DRAWINGS

An advantageous configuration of the invention is explained in more detail in the following text on the basis of the accompanying drawings, in which.

DETAILED DESCRIPTION

Figure 1:
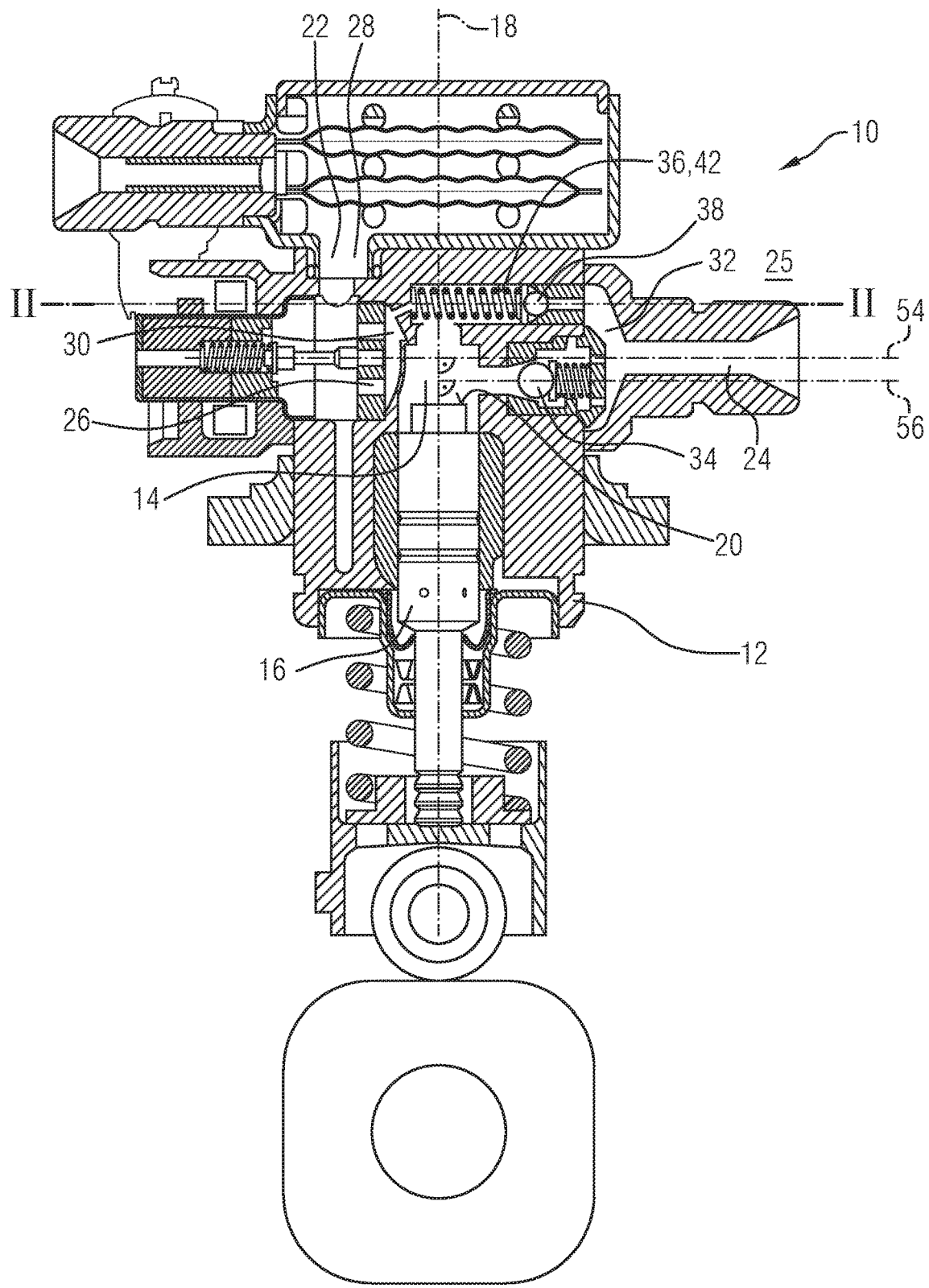
FIG. 1 shows an illustration in longitudinal section of a high-pressure fuel pump having a pressure-limiting valve arranged in a bore.

FIG. 1 shows an illustration in longitudinal section of a high-pressure fuel pump 10. Arranged in a housing 12 of the high-pressure fuel pump 10 is a pressure chamber 14, in which a piston 16 moves up and down in translation along a movement axis 18 and thus periodically compresses and relieves the pressure on a fuel arranged in the pressure chamber 14. The piston 16 moving in the pressure chamber 14 has a piston surface 20 which bounds the pressure chamber 14 downwardly. In order for the fuel to be fed into the pressure chamber 14, the pressure chamber 14 is connected on the inlet side to a low-pressure inflow 22.

Pressurized fuel is passed on the outlet side to a high-pressure region 25 via a high-pressure port 24. The high-pressure port 24 then passes the pressurized fuel on to a common rail located downstream for example.

Arranged in the low-pressure feed 22 is an inlet valve 26 which separates an inflow bore 28 from an inflow volume 30 which is directly connected hydraulically to the pressure chamber 14. The inflow volume 30 is not part of the pressure chamber 14, however.

The high-pressure port 24 is configured such that, together with the housing 12, it defines an outlet volume 32 into which the pressurized fuel passes via an outlet valve 34. From this outlet volume 32, a bore 36 extends into the housing 12. Arranged in the bore 36 is a pressure-limiting valve 38, which discharges fuel out of the high-pressure port 24 when an excessive overpressure builds up in the high-pressure region 25.

Figure 2:
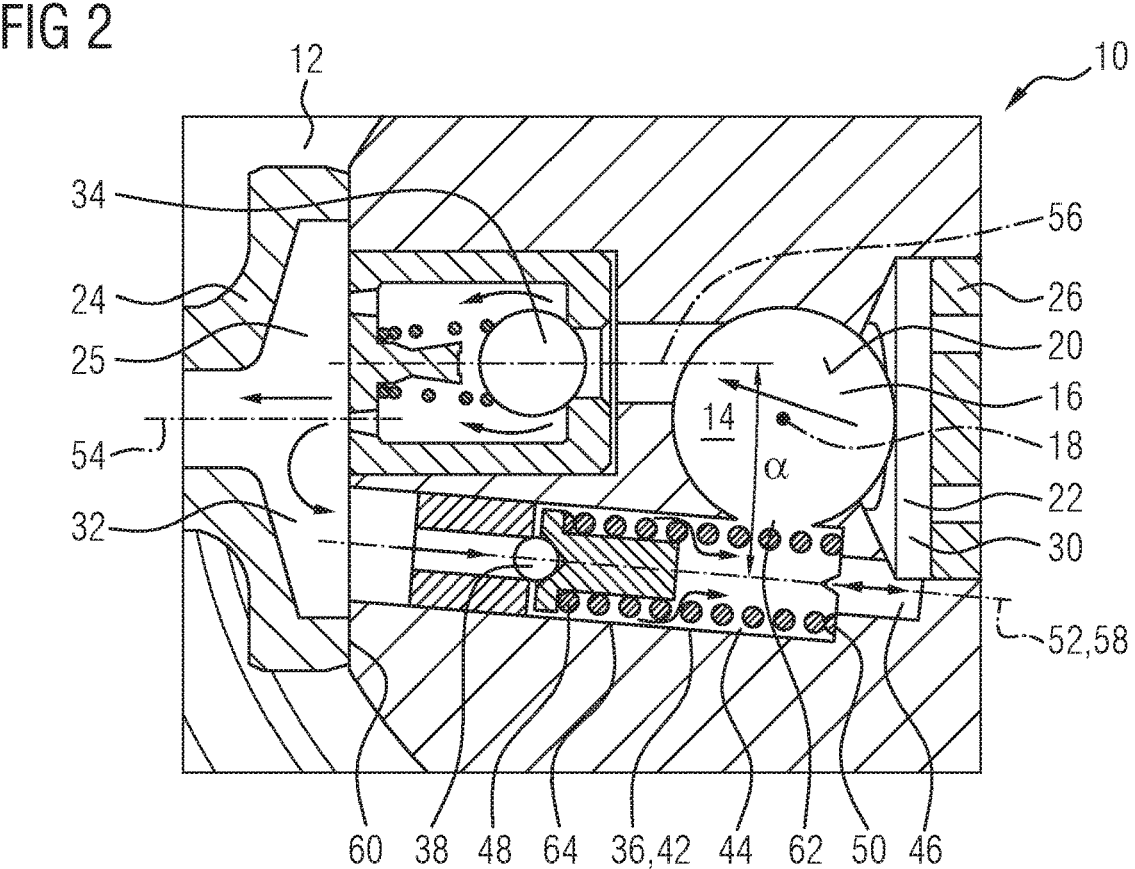
FIG. 2 shows a top view in cross section on the line II-II in FIG. 1 of the high-pressure fuel pump having the pressure-limiting valve.

FIG. 2 shows an illustration in cross section of the high-pressure fuel pump 10 along the line II-II in FIG. 1 in a top view. It can be seen here that the bore 36 in which the pressure-limiting valve 38 is arranged extends entirely from the high-pressure port 24 and the outlet volume 32 to the inflow volume 30. Therefore, the bore 36 is in the form of a through-bore 42.

The bore 36 has a receiving region 44, in which the pressure-limiting valve 38 is received, and also comprises a connecting region 46, which establishes the connection between the receiving region 44 and the inflow volume 30 of the low-pressure inflow 22. In this case, the connecting region 46 has a smaller cross section than the receiving region 44, and so a restoring spring 48 of the pressure-limiting valve 38 can be supported on a resultant end wall 50 of the bore 36. The connecting region 46 is thus arranged in the end wall 50.

The restoring spring 48 has a longitudinal axis 52 which extends in a force direction of the restoring spring 48. The bore 36 extends coaxially with this longitudinal axis 52, specifically such that the connecting region 46 is also arranged coaxially with the longitudinal axis 52 of the restoring spring 48. As a result, fuel discharged via the pressure-limiting valve 38 can be discharged directly into the inflow volume 30 in a laminar manner.

As is also apparent from FIG. 1 and FIG. 2, a longitudinal axis 54 of the high-pressure port 24 is arranged perpendicularly to the movement axis 18 of the piston 16. A longitudinal axis 56 of the outlet valve 34 is also arranged perpendicularly to the movement axis 18 of the piston 16. By contrast, a longitudinal axis 58 of the bore 36 is not, as was previously known, likewise arranged perpendicularly to the movement axis 18 of the piston 16 but at an angle α to the high-pressure-port longitudinal axis 54. This angle α varies in a range between 1° and 10°, in particular between 2° and 8°, preferably between 4° and 6°. As a result, the outlet volume 32 of the high-pressure port 24 can be designed in a smaller manner than would be the case with a bore longitudinal axis 58 arranged perpendicularly to the movement axis 18, and so forces acting for example on a weld seam 60 of the high-pressure port 24 also become smaller.

Figure 3:
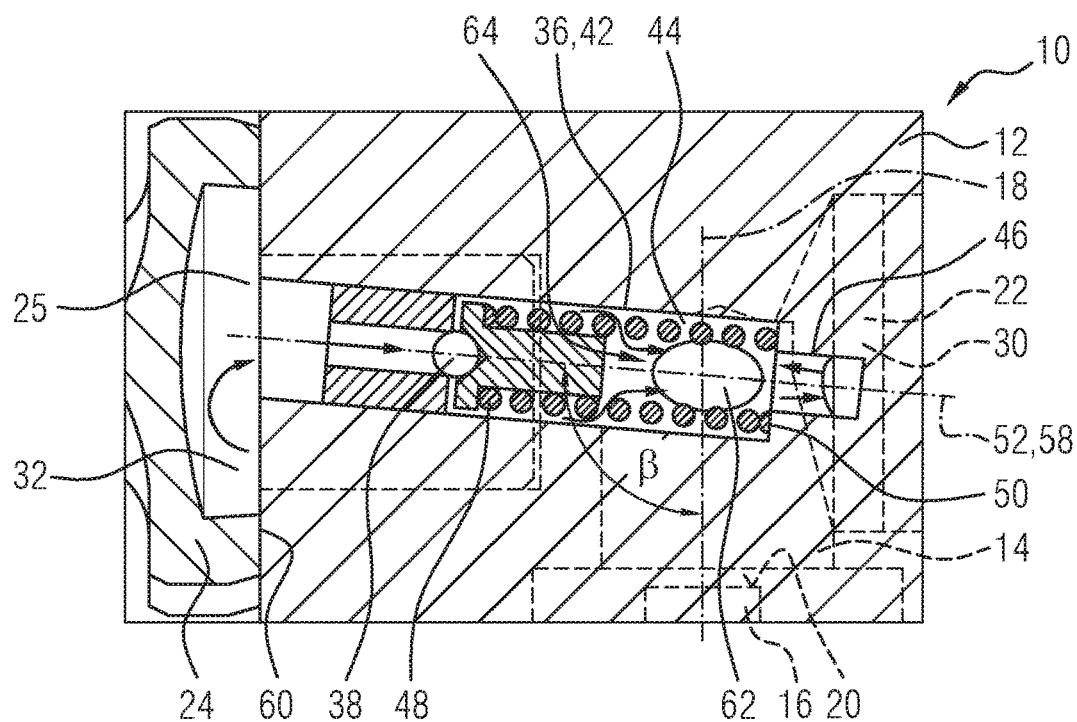
FIG. 3 shows an illustration in longitudinal section of the high-pressure fuel pump from FIG. 1 in a detail view in the region of the pressure-limiting valve.

FIG. 3 shows a view in longitudinal section of the high-pressure fuel pump 10 from FIG. 1 in a detail region of the pressure-limiting valve 38 and of the bore 36. It can be seen here that the bore 36 is arranged not only in a horizontally angled manner (cf. FIG. 2) with respect to the high-pressure-port longitudinal axis 54 but also in a perpendicularly angled manner, resulting in an angle β between the bore longitudinal axis 58 and movement axis 18 which varies in a range between 95° and 105°, in particular between 98° and 102°. As a result of this, too, the outlet volume 32 can be designed in a smaller manner, such that acting forces are reduced.

Figure 4:
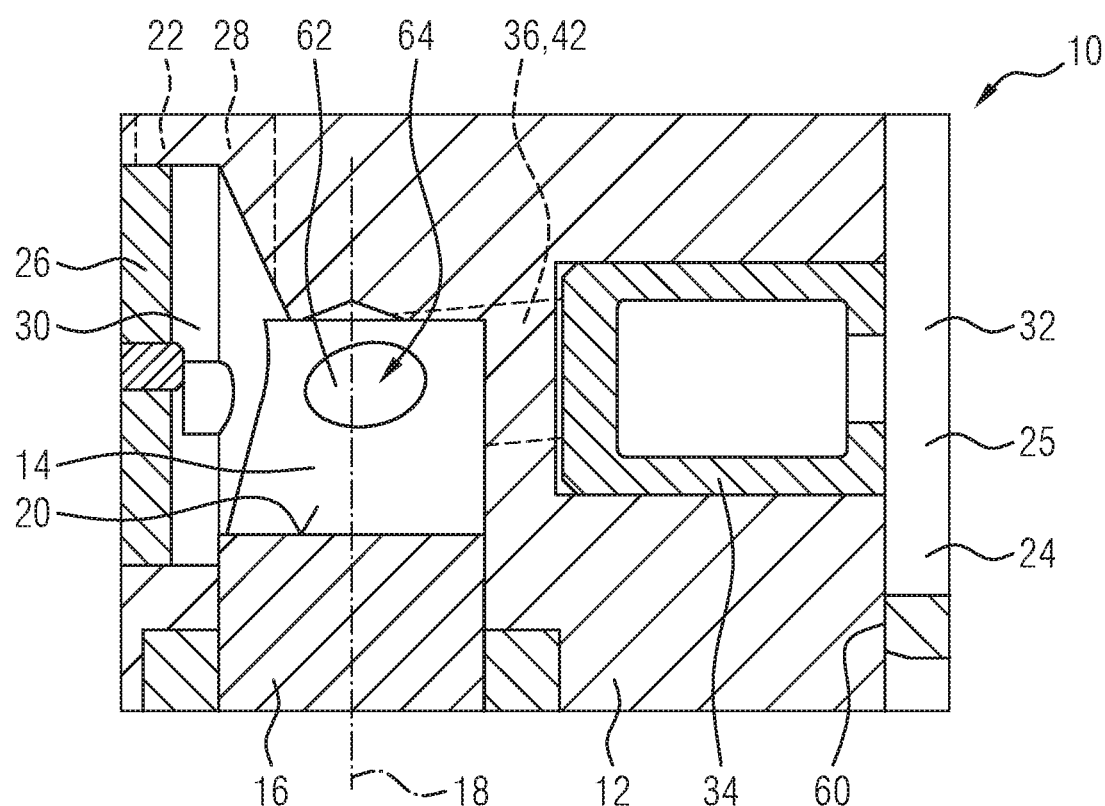
FIG. 4 shows an illustration in longitudinal section of the high-pressure fuel pump from FIG. 1 in a further detail view in the region of a pressure chamber of the high-pressure fuel pump.

FIG. 4 shows a further illustration in longitudinal section in detail in a region of the pressure chamber 14. It can be seen here that, in a preferred configuration, the bore 36 has not only the connecting region 46 to the inflow volume 30 but also a connecting aperture 62 which connects the bore 36 directly to the pressure chamber 14. In this case, the connecting aperture 62 is arranged in a side wall 64 of the bore 36, which extends parallel to the longitudinal axis 52 of the restoring spring 48 and thus co-defines the receiving region 44 for the pressure-limiting valve 38.

Since the connecting aperture 62 is present in addition to the connecting region 46, it is possible for circulation of the fuel to be achieved during operation of the high-pressure fuel pump 10, with the result that the bore 36 can be constantly flushed and cleaned of contaminants.

During the production process for the high-pressure fuel pump 10, too, the presence of the connecting region 46 has great advantages. This is because the normally present outflow bore from the bore 36 into the pressure chamber 14 is usually created by boring the pressure chamber 14. As a result, an undefined contour arises, which is both difficult to deburr on account of tolerance fluctuations and can result in damage to the components upon further machining of the construction curve, for example honing. In addition, there is the drawback, when the bore 36 is embodied as a blind bore, that particles can collect in the rear region, in particular during the production process (honing), and can clog the bore 36. Thus far, it has been known to flush out the bore 36 for example by way of specially manufactured flushing lances, which remove the honing sludge with high pressure. However, since the pressure-limiting valve 38 is usually already present in the bore 36 during the production process, there is always the risk of the restoring spring 48 being damaged during the honing process or lance flushing. This can now be prevented in that advantageously only the connecting region 48 is provided, which is configured such that it is possible to dispense with the connecting aperture 62. In an advantageous configuration, it is even possible to dispense with lance flushing, and this can result in an increase in process reliability or a simplification of the process.

If, by contrast, the connecting aperture 62 is present, circulation of cleaning suspension during washing can be generated during the production process, too, with the result that the bore 36 can be flushed better.

The invention claimed is:

1. A high-pressure fuel pump, comprising:
a housing;
a piston having a piston surface;
a pressure chamber arranged in the housing, said pressure chamber being bounded on one side by the piston surface on the piston that moves in translation along a movement axis in the pressure chamber;
a high-pressure port;
a low-pressure inflow, the pressure chamber is connected on the inlet side to the low-pressure inflow for feeding fuel to the pressure chamber and on the outlet side to the high-pressure port which, together with the housing, defines an outlet volume;
an inflow bore;
an inlet valve arranged in the low-pressure inflow such that the inflow bore of the low-pressure inflow is separated from an inflow volume, directly connected hydraulically to the pressure chamber, of the low-pressure inflow;
a pressure-limiting valve for discharging an overpressure in the outlet volume is provided;
a second bore extending from the outlet volume into the housing, the pressure limiting valve arranged in the second bore, and the second bore leads into the inflow volume of the low-pressure inflow;
a connecting region being part of the second bore, wherein the connecting region hydraulically connects the second bore to the inflow volume; and
a connecting aperture being part of the second bore, the connecting aperture hydraulically connecting the second bore to the pressure chamber.

2. The high-pressure fuel pump as claimed in claim 1, wherein the bore is in the form of a through-bore which has a receiving region for receiving the pressure-limiting valve, wherein the connecting region has a smaller cross section than the receiving region.

3. The high-pressure fuel pump as claimed in claim 2, wherein the pressure-limiting valve has a restoring spring with a longitudinal axis in the force direction of the restoring spring, wherein the connecting region is arranged coaxially with the longitudinal axis of the restoring spring.

4. The high-pressure fuel pump as claimed in claim 3, wherein the receiving region of the second bore has an end wall that bounds the second bore perpendicularly to the longitudinal axis of the restoring spring, said end wall being arranged on the opposite side from the outlet volume, wherein the restoring spring is supported on the end wall, and wherein the connecting region is arranged in the end wall.

5. The high-pressure fuel pump as claimed in claim 1, wherein the second bore has a connecting aperture to the pressure chamber for hydraulically connecting the second bore to the pressure chamber.

6. The high-pressure fuel pump as claimed in claim 5, wherein the connecting aperture is arranged in a side wall of the second bore, said side wall extending parallel to the longitudinal axis of the restoring spring.

7. The high-pressure fuel pump as claimed in claim 1, wherein a longitudinal axis of the high-pressure port extends substantially perpendicularly to the movement axis of the piston, and in that a longitudinal axis of the second bore is arranged at an angle of between 1° and 10° to the high-pressure-port longitudinal axis.

8. The high-pressure fuel pump as claimed in claim 1, wherein a longitudinal axis of the second bore is arranged at an angle of between 95° and 105° to the movement axis of the piston.

9. The high-pressure fuel pump as claimed in claim 1, wherein a longitudinal axis of the high-pressure port extends substantially perpendicularly to the movement axis of the piston, and in that a longitudinal axis of the second bore is arranged at an angle of between 2° and 8° to the high-pressure-port longitudinal axis.

10. The high-pressure fuel pump as claimed in claim 1, wherein a longitudinal axis of the high-pressure port extends substantially perpendicularly to the movement axis of the piston, and in that a longitudinal axis of the second bore is arranged at an angle of between 4° and 6° to the high-pressure-port longitudinal axis.

11. The high-pressure fuel pump as claimed in claim 1, wherein a longitudinal axis of the second bore is arranged at an angle of between 98° and 102°, to the movement axis of the piston.

* * * * *